United States Patent [19]

Morishima

[11] Patent Number: 4,727,568
[45] Date of Patent: Feb. 23, 1988

[54] UNIT FOR PREVENTING AN INTERCEPTION OF A RADIO COMMUNICATION SIGNAL TRANSMITTED BETWEEN A FIXED FACILITY AND A MOBILE STATION

[75] Inventor: Mitsunori Morishima, Tokyo, Japan

[73] Assignee: NEC Corporation, Tokyo, Japan

[21] Appl. No.: 829,249

[22] Filed: Feb. 14, 1986

[30] Foreign Application Priority Data

Feb. 14, 1985 [JP] Japan ................................. 60-27093
Mar. 13, 1985 [JP] Japan ................................. 60-50061

[51] Int. Cl.⁴ ............................................. H01Q 7/04
[52] U.S. Cl. ....................................... 379/58; 379/56; 379/63; 380/6
[58] Field of Search ................. 179/2 E, 2 EA, 2 EB, 179/2 EC, 1.5 M; 455/1, 166, 30; 379/56, 58, 63

[56] References Cited

U.S. PATENT DOCUMENTS

| | | | |
|---|---|---|---|
| 4,241,236 | 12/1980 | Nash ................................. | 179/2 EA |
| 4,450,319 | 5/1984 | Lucey ............................... | 179/2 EA |
| 4,517,561 | 5/1985 | Burke et al. ..................... | 340/825.07 |
| 4,543,665 | 9/1985 | Soteld et al. ..................... | 455/606 |
| 4,555,592 | 11/1985 | Deinzer ............................. | 179/2 E |

*Primary Examiner*—Robert Lev
*Attorney, Agent, or Firm*—Sughrue, Mion, Zinn, Macpeak, and Seas

[57] ABSTRACT

In a radio frequency communication system in which a radio frequency communication signal is transmitted between a radio terminal (14) and a mobile station (24), it may be that an unauthorized third person uses a scanner-receiver (60) to intercept the communication signal. In order to prevent such an interception, the unit comprises a detecting circuit (30) for detecting an internal signal which is transmitted between a telephone exchange (12) and the radio terminal (14) and is concerned with an ordinary voice signal. The detection circuit produces a detection signal when the internal signal is absent. Responsive to the detection signal, a control circuit (32) controls the internal signal to prevent the interception, as by sending a dummy voice signal whenever the ordinary voice signal is absent. Alternatively, the control circuit may produce a control signal while the communication signal is received from the mobile station and consequently while the internal signal is sent form the radio terminal to the exchange. In this event, the control signal is used either in attenuating or switching off an echo signal which usually results from the internal signal reaching the exchange.

7 Claims, 4 Drawing Figures

UNIT FOR PREVENTING AN INTERCEPTION OF A RADIO COMMUNICATION SIGNAL TRANSMITTED BETWEEN A FIXED FACILITY AND A MOBILE STATION

BACKGROUND OF THE INVENTION

This invention relates to a unit for use in a fixed facility and a mobile station of a radio frequency communication system, such as a mobile telephone system.

A conventional mobile telephone system comprises a telephone exchange, a base station, and a plurality of mobile stations. The base station is coupled to the telephone exchange through a wire circuit and/or a radio circuit. The mobile stations are carried on automobiles and the like. A combination of the base station and the telephone exchange is herein called a fixed facility of the radio frequency communication system.

The base station includes a radio terminal for transmitting and receiving a radio frequency communication signal between the radio terminal and each mobile station. The communication signal corresponds to an internal signal which is transmitted between the telephone exchange and the radio terminal and concerned with an ordinary voice signal of a frequency band between 0.3 kHz and 3 kHz. When the communication signal is transmitted between the radio terminal and a selected one of the mobile stations, the selected mobile station receives or transmits the communication signal from and to the radio terminal through a selected one of a plurality of radio channels.

The conventional mobile telephone system is disadvantageous in that the communication signal is liable to reception by a third person, namely, to be intercepted by the third person. For example, the communication signal can be readily received by a radio scanner-receiver which is sold on the market. The radio scanner-receiver comprises an auto-tuning circuit capable of scanning the radio channels and of automatically detecting that one of the radio channels through which the communication signal is transmitted between the radio terminal and the selected mobile station.

When only a small number of the radio channels are available, the radio scanner-receiver readily intercepts the communication signal. The interception of the communication signal can not be prevented even by transmitting an idle signal through idle ones of the radio channels. Specifically, such an idle signal sounds as a tone specific thereto and can be distinguished by the third person from the ordinary voice signal. Therefore, the third person is not confused by the idle signal.

Interception of a communication signal is possible by monitoring an echo signal which occurs through the radio terminal and the telephone exchange when the communication signal is received by the radio terminal from a mobile station. An echo suppressor is included in the conventional mobile telephone system between the telephone exchange and the radio terminal and may serve to attenuate the echo signal. However, the echo suppressor is insufficient to prevent the interception.

SUMMARY OF THE INVENTION

It is therefore an object of the present invention to provide a unit which is useful in preventing an interception of a radio communication signal in a radio frequency communication system.

Other objects of this invention will become clear as the description proceeds.

A unit to which this invention is applicable is for use in a fixed facility of a radio frequency communication system between a telephone exchange of the fixed facility and a radio terminal thereof in preventing an interception of a radio frequency communication signal which is transmitted between the radio terminal and a mobile station of the radio frequency communication system and corresponds to an internal signal transmitted between the telephone exchange and the radio terminal and related to the communication signal. According to this invention, the unit comprises detecting means coupled to at least one of the telephone exchange and the radio terminal for detecting the internal signal to produce a detection signal indicative of presence and absence of the internal signal, and control means responsive to the detection signal for controlling the internal signal to prevent the interception of the communication signal.

DESCRIPTION OF THE PREFERRED EMBODIMENT

Figure 1:
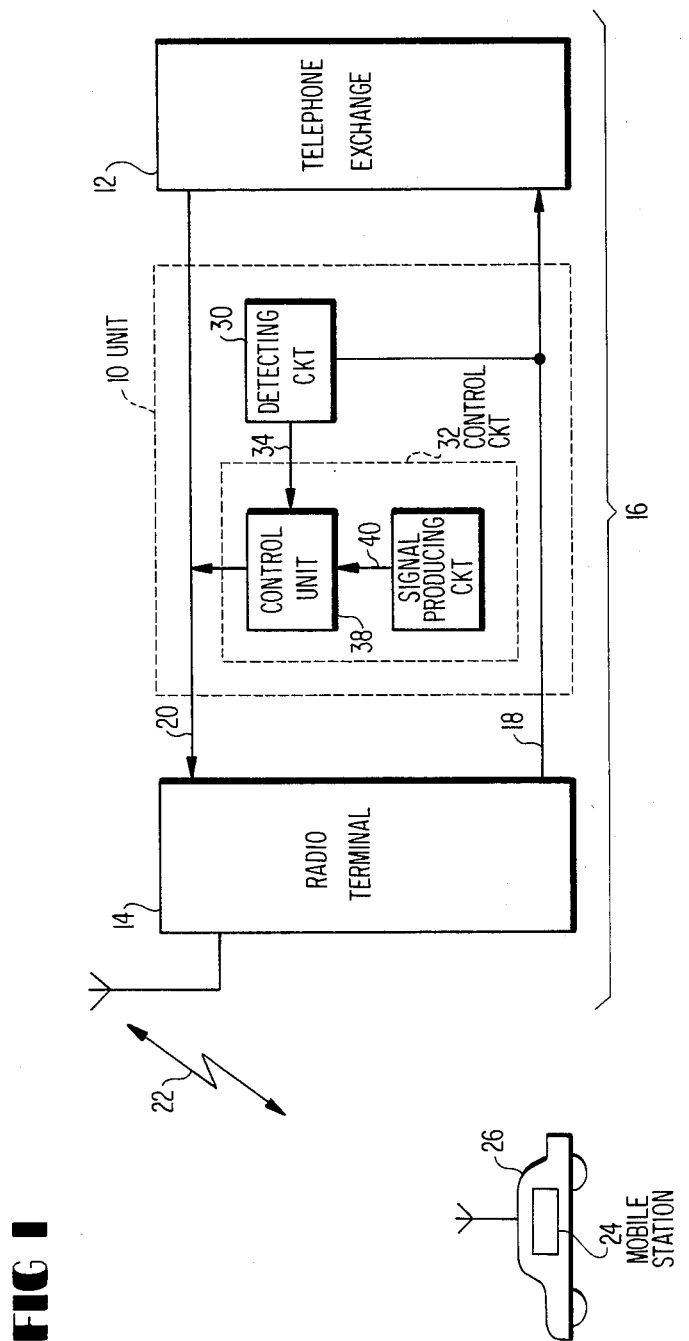
FIG. 1 shows, together with a mobile station, a block diagram of a fixed facility of a mobile telephone system comprising a unit according to a first embodiment of this invention.

Referring to FIG. 1, a mobile telephone system will be described as an example of a radio frequency communication system. The mobile telephone system comprises a unit 10 according to a first embodiment of this invention. The unit 10 is used between a telephone exchange 12 for a plurality of subscribers and a plurality of base stations for different service areas. Each base station may be located remote from the telephone exchange 12 and comprises a radio terminal 14. In the manner described above, a combination of the telephone exchange 12 and the radio terminal 14 is herein called a fixed facility 16 of the mobile telephone system.

An internal signal is transmitted between the telephone exchange 12 and the radio terminal 14. The internal signal is concerned with an ordinary voice signal which results from one of the subscribers. The internal signal may consist of a reception signal 18 sent from the radio terminal 14 to the telephone exchange 12 and a transmission signal 20 sent from the telephone exchange 12 to the radio terminal 14. The illustrated reception signal 18 may be specified by a reception detection signal while the illustrated transmission signal 20 may be specified by an ordinary voice signal, as will become clear as the description proceeds.

The radio terminal 14 includes a transmitter-receiver (not shown) for transmitting a radio frequency communication signal 22 to a mobile station 24 and receiving a radio frequency communication signal from the mobile station. The radio terminal 14 produces the reception signal 18 in response to the communication signal 22 received from the mobile station 24. The radio terminal 14 furthermore produces the communication signal 22 in response to the transmission signal 20.

The mobile telephone system further comprises a plurality of mobile stations, such as 24. In the example being illustrated, the mobile station 24 is on an automobile 26. In the manner which will be described far later in the description, the mobile station 24 includes a transmitter-receiver for transmitting and receiving the communication signal 22.

The unit 10 comprises a detecting circuit 30 and a control circuit 32. In the example being illustrated, the detecting circuit 30 is coupled to the radio terminal 14 for detecting presence and absence of the reception signal 18 sent from the radio terminal 14 to the telephone exchange 12. When the reception signal 18 is not detected, a detection signal 34 is produced from the detecting circuit 30.

The control circuit 32 is operable in response to the detection signal 34 and controls the transmission signal 20 sent from the telephone exchange 12 to the radio terminal 14. More specifically, the control circuit 32 comprises a signal producing unit 36 and a control unit 38. The signal producing unit 36 is for producing a dummy voice signal 40 which falls within an audio frequency band between 0.3 kHz and 3 kHz and which is variable in frequency within the audio frequency band like the ordinary audio signal, differing from an idle signal of an invariable frequency, such as 1 kHz. In this connection, the dummy voice signal may be called a quasi voice signal and be misunderstood as any meaningful information by a third person. Anyway, the third person may be confused at the dummy voice signal.

The control unit 38 is coupled to the signal producing unit 36 and is responsive to the detection signal 34 and adds the dummy voice signal 40 to the transmission signal 20. The control unit 38 therefore serves as an adding unit for adding the dummy voice signal 40 to the transmission signal 20 to produce an additional inside signal which succeeds and precedes the transmission signal 20. Thus, the dummy voice signal 40 is produced instead of the transmission signal 20. In the manner which will better be described in detail, the radio terminal 14 transmits an additional radio signal in response to the additional inside signal. Production of the dummy voice signal 40 is effective to reduce a probability of an interception of the communication signal, as will later be described in detail.

Figure 2:
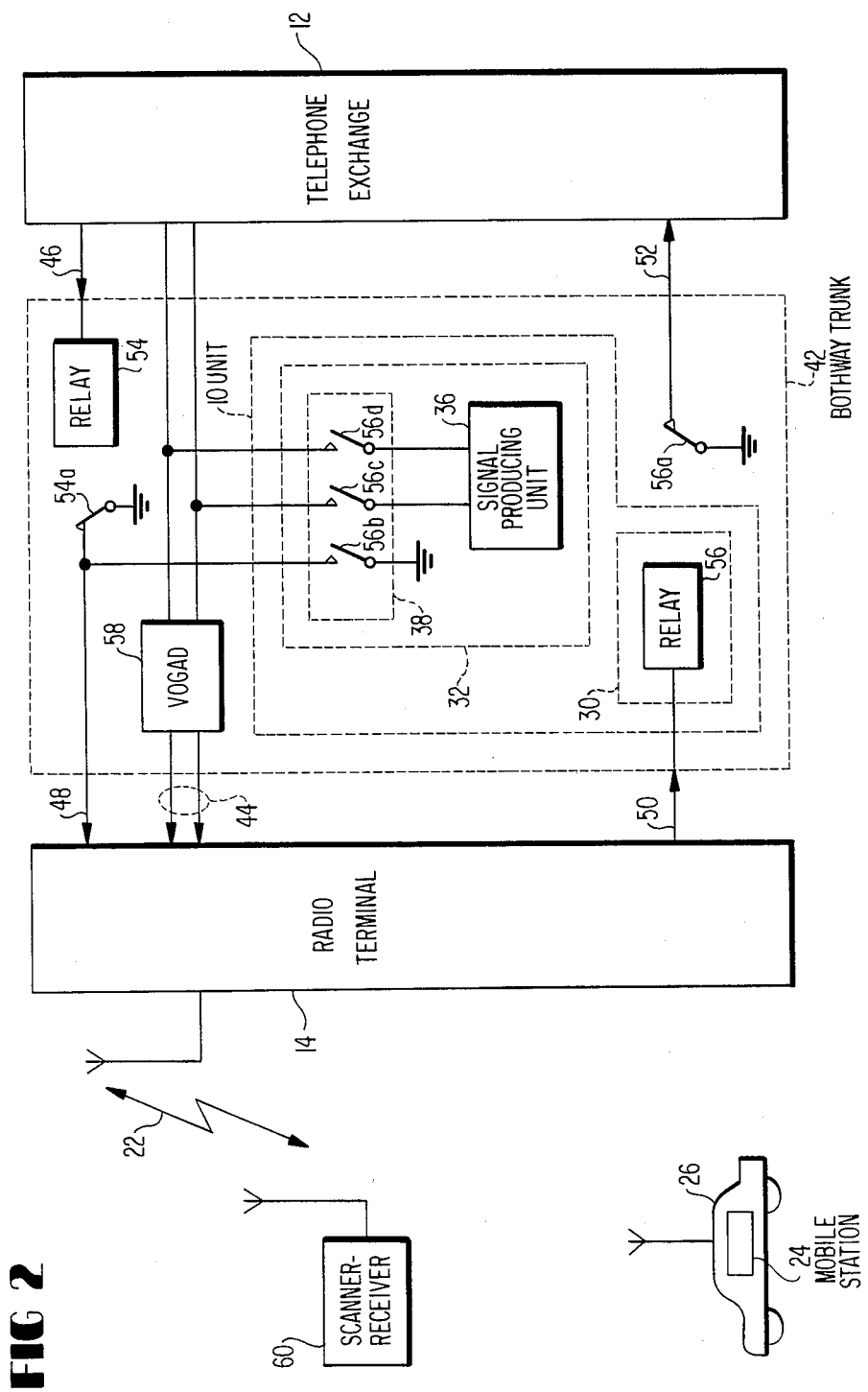
FIG. 2 shows in detail, together with a radio scanner-receiver, the mobile telephone system shown in FIG. 1.

Referring to FIG. 2, the unit 10 illustrated in FIG. 1 will be described more in detail and is included in a bothway trunk 42 which is used between the telephone exchange 12 and the radio terminal 14 and is operable in cooperation with the telephone exchange 12 in the illustrated example. In the manner known in the art, the bothway trunk 42 is coupled to a plurality of lines, such as a set of transmission voice lines 44, a transmission detection line 46, a transmission control line 48, a reception voice line (not shown), a reception detection line 50, and a reception control line 52.

When a subscriber begins to communicate with the mobile station 24, the telephone exchange 12 supplies a transmission detection signal in a known manner through the transmission detection line 46. The telephone exchange 12 furthermore supplies a transmission signal concerned with an ordinary voice signal through the transmission voice line set 44.

When the mobile station 24 begins to communicate with such a subscriber, the radio terminal 14 receives the communication signal 22 and produces a reception signal concerned with an ordinary voice signal and a reception detection signal. The reception signal is sent to the reception voice line. The reception detection signal is sent to the reception detection line 50.

The bothway trunk 42 further includes a transmission relay 54 and a reception relay 56. The transmission relay 54 is coupled to the transmission detection line 46 and serves as a detector for the transmission detection signal. The transmission relay 54 has a single contact point 54a. When the transmission detection signal is present and absent in the transmission detection line 46, the transmission relay 54 grounds the transmission control line 48 through the single contact point 54a and removes the ground from the transmission control line 48 respectively.

The reception relay 56 is coupled to the reception detection line 50 and serves as a detector for the reception detection signal. The reception relay 56 has first through fourth contact points 56a, 56b, 56c, and 56d. When the reception detection signal is present in the reception detection line 50, the reception relay 56 grounds the reception control line 52 through the first contact point 56a. Otherwise, the first contact point 56a disconnects the reception control line 52 from ground. The second through the fourth contact points 56b to 56d serve as the above-described control unit 38. When the reception detection signal is absent and present in the reception detection line 50, the second contact point 56b places ground on the transmission control line 48 and removes the ground, respectively. When the reception detection signal is absent, the third and the fourth contact points 56c and 56d are closed to supply the dummy voice signal 40 as the additional inside signal to the set of transmission voice lines 44 from the signal producing circuit 36, with the transmission control line 48 grounded through the second contact point 56b.

In FIG. 2, the transmission signal 20 is supplied to the radio terminal 14 through the transmission voice line set 44 after passing through a vogad amplifier 58. The ground is supplied to the radio terminal 14 as the transmission control signal through the transmission control line 48. The radio terminal 14 transmits the communication signal 22 in response to the transmission signal. On the other hand, the reception signal is supplied to the telephone exchange 12 through the reception voice line. The reception control signal of earth potential is supplied to the telephone exchange 12 through the reception control line 50.

It is now understood that the transmission signal 20 is transmitted by the radio terminal 14 under the control of the transmission control signal of ground to the mobile station 24 as the communication signal 22 while the subscriber is talking to the mobile station 24. The communication signal 22 is also sent from the mobile station 24 to the radio terminal 14 during the talk between the subscriber and the mobile station 24.

In the meanwhile, a scanner-receiver 60 may receive the communication signal 22 despite the fact that the scanner-receiver 60 is unauthorized to do so. The scanner-receiver 60 can seize each radio channel by scanning the radio channels one by one. Such scanning operation can be skipped from one channel to another on detection of an idle signal of, for example, 1 kHz.

In the communication system illustrated in FIG. 2, the dummy voice signal is sent as the communication signal 22 through each of idle radio channels from the radio terminal 14 while no communication is carried out between a subscriber and the mobile station 24 through the idle radio channel. More particularly, the transmission detection signal disappears from the transmission detection line 46. The transmission relay 54 opens the contact point 54a to remove the ground from the transmission control line 48. Likewise, the reception detection signal disappears from the reception detection line 50. The reception relay 56 grounds the transmission control line 48 in place of the transmission relay 54 and furthermore sends the additional inside signal to the radio terminal 14 through the transmission voice line set 44 and the vogad amplifier 58. The radio terminal 14 therefore sends the additional radio signal in the manner described in conjunction with FIG. 1.

The scanner-receiver 60 stops scanning at every idle radio channel and may come to a standstill for a while until the additional radio signal is recognized as the dummy voice signal which is meaningless at all. Recognition of the dummy voice signal must be made at every idle channel. As a result, it takes a long time to scan all of the radio channels by the scanner-receiver 60. This reduces a possibility of the interception of the communication signal 22.

Figure 3:
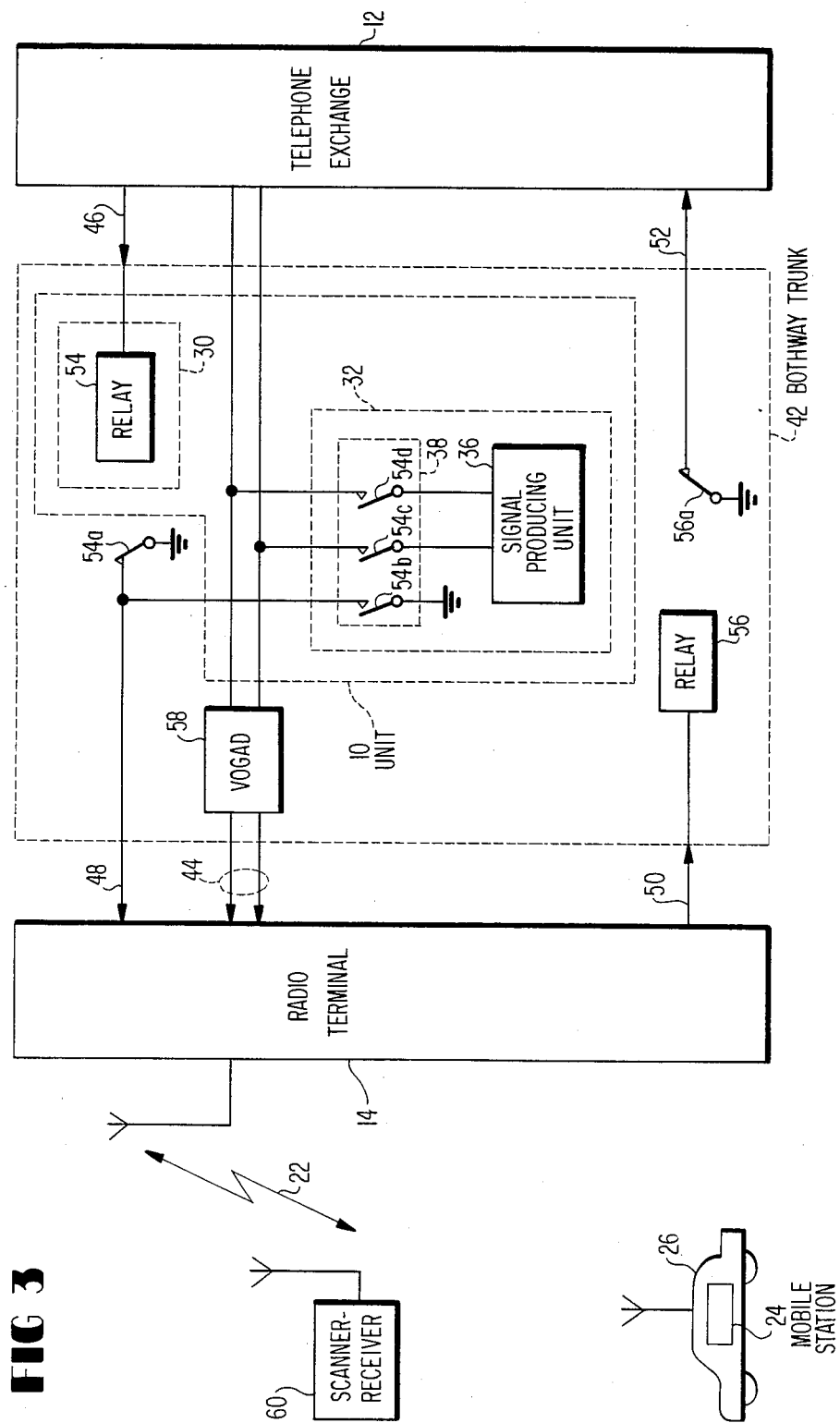
FIG. 3 is a similarly detailed view of a mobile telephone system comprising a unit according to a second embodiment of this invention.

Referring to FIG. 3, a mobile telephone system comprises similar parts which are designated by like reference numerals. In the unit 10, the single contact point 54a of the transmission relay 54 will now be called a first contact point. In addition, the transmission relay 54 has second through fourth contact points 54b, 54c, and 54d. When the transmission detection signal is absent in the transmission detection line 46, the transmission relay 54 places ground on the transmission control line 48 through the second contact point 54b in place of the first contact point 54a. Furthermore, the dummy voice signal 40 is delivered from the signal producing unit 36 to the transmission voice line set 44 through the third and the fourth contact points 54c and 54d. The second through the fourth contact points 54b and 54d serve as the control unit 38.

With this structure, the reception relay 56 is deenergized in the absence of the reception detection signal 40 and the contact point 56a is disconnected from the ground when no communication is carried out between the mobile station 24 and the radio terminal 14. Disconnection of the contact point 56a from the ground is transmitted as the reception control signal from the contact point 56a through the reception control line 52 and the telephone exchange 12 to the transmission relay 54. Thus, the reception control signal is delivered to the transmission relay 54 as the transmission control signal to disconnect the transmission control line 48 from the first contact point 54a. In this event, the second through fourth contact points 54b to 54d are connected to the transmission control line 48 and to the transmission voice line set 44. Under the circumstances, the dummy voice signal is sent from the dummy signal producing circuit 36 to the radio terminal 14 through the transmission voice line set 44 in the manner described in conjunction with FIG. 2.

Therefore, the dummy voice signal is delivered to the mobile station 24 and the scanner-receiver 60 through each idle radio channel as the additional radio signal. Thus, the additional radio signal serves to detain the scanning operation of the scanner-receiver 60 as mentioned with reference to FIG. 2.

Figure 4:
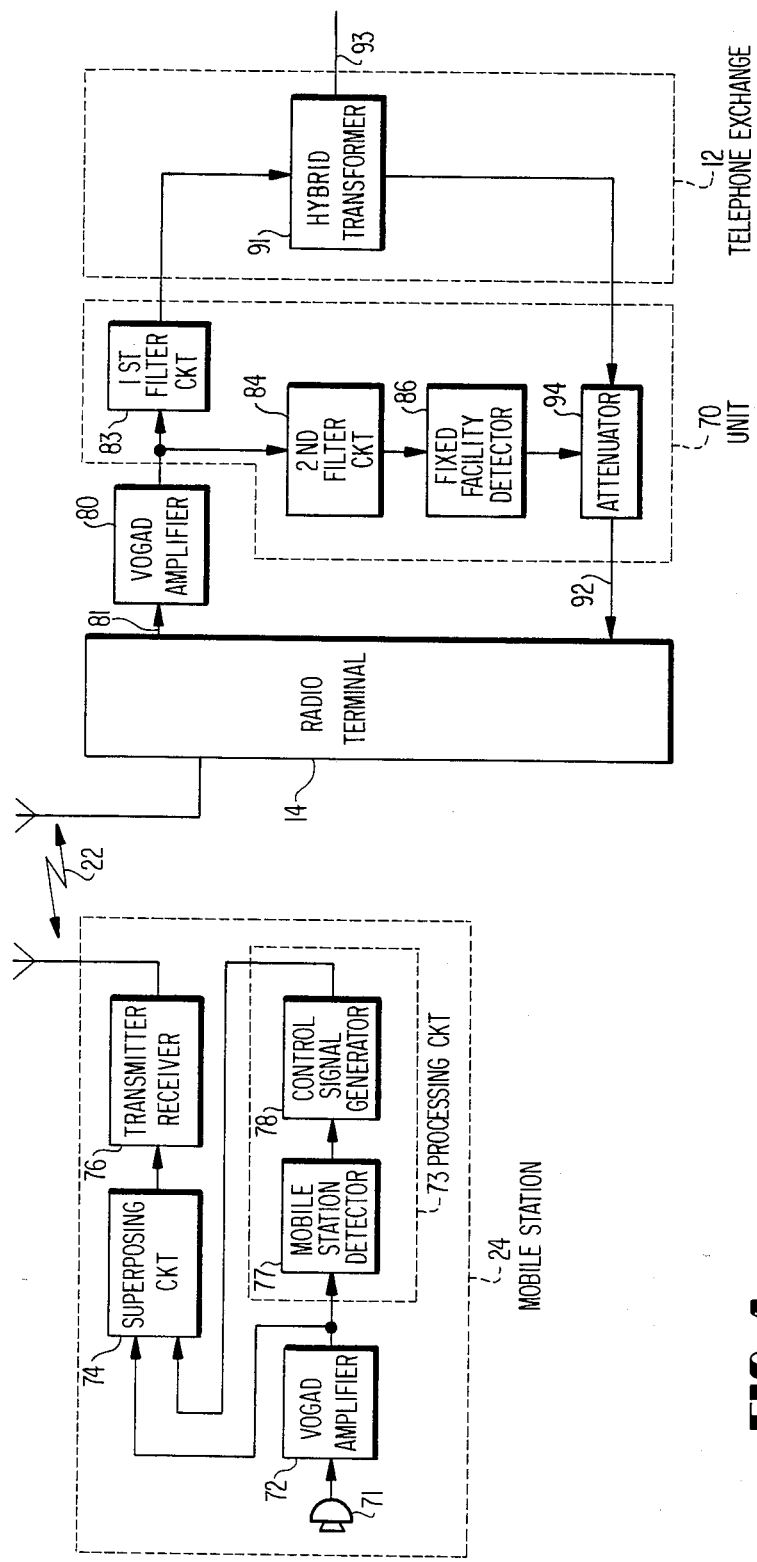
FIG. 4 is a likewise detailed view of a mobile telephone system comprising a unit according to a third embodiment of this invention.

Referring to FIG. 4, a mobile telephone system comprises similar parts which are designated once again by like reference numerals. The mobile station 24 will be described a little more in detail. The unit of the fixed facility 16 (FIG. 1) is somewhat different from those described in connection with FIGS. 2 and 3 and will be indicated at 70.

The mobile station 24 comprises a microphone 71 and a vogad amplifier 72. When a user of the mobile station 24 speaks, the microphone 71 produces an ordinary voice signal. A processing circuit 73 generates a control signal in the manner which will shortly be described. The ordinary voice signal is delivered to a superposing circuit 74 through the vogad amplifier 72. The superposing circuit 74 is for superposing the control signal on the ordinary voice signal to produce a superposed signal. The control signal is different in frequency from the ordinary voice signal. For example, the control signal may have a frequency of 3.4 kHz or 0.1 kHz. A transmitter-receiver 76 transmits the superposed signal as a radio frequency communication signal 22 to the radio terminal 14 and receives a like radio communication signal from the radio terminal 14 in the known manner.

The processing circuit 73 comprises a mobile station detector 77 for detecting presence and absence of the ordinary voice signal through the vogad amplifier 72. Only when the ordinary voice signal is present, a control signal generator 78 generates the control signal. The communication signal 22 is transmitted from the mobile station 24 to the radio terminal as a combination of a first and a second radio signal. The first radio signal is concerned with the ordinary voice signal. The second radio signal represents the control signal and is superposed on the first radio signal.

Responsive to the first and the second radio signals of the communication signal 22, the radio terminal 14 produces a first and a second reception signal. The first reception signal is concerned with the ordinary voice signal. The second reception signal is representative of the control signal. The radio terminal 14 sends the first and the second reception signals to a vogad amplifier 80 through a reception line 81.

The unit 70 comprises a first filter circuit 83, a second filter circuit 84, and a fixed facility detector 86. Supplied with the first and the second reception signals through the vogad amplifier 80, the first filter circuit 83 cuts off the second reception signal and sends only the first reception signal to the telephone exchange 12. Similarly, the second filter circuit 84 cuts off the first reception signal and sends the second reception signal alone to the fixed facility detector 86. Responsive to the second reception signal, the fixed facility detector 86 produces the detection signal.

The telephone exchange 12 comprises a hybrid transformer 91 for coupling the reception line 81 and a transmission line 92 to a communication line 93 which leads to a subscriber's substation (not shown). The transmission line 92 is for transmitting a transmission signal as the internal signal. As a rule, a part of the first reception signal appears in the transmission line 92 through the hybrid transformer 91 as an echo signal. Namely, the internal signal in the transmission line 92 consists of the transmission voice signal and the echo signal.

The unit 70 further comprises an attenuator 94 which is placed in the transmission line 92 and which is controlled by the detection signal delivered from the fixed facility detector 86. The attenuator 94 is for attenuating only the echo signal and serves as the control unit 38 illustrated in FIG. 1. This is because the detection signal is given from the fixed facility detector 86 to the attenuator 94 only when the echo signal is returned back to the attenuator 94. As a result, only the transmission voice signal passes through the attenuator 94 and is supplied as the internal signal to the radio terminal 14. The radio terminal 14 transmits the communication signal 22 in response to the transmission voice signal. No echo signal is transmitted from the radio terminal 14.

Therefore, even if the communication signal 22 is received by an unauthorized third person who uses the scanner-receiver 60, the communication will hardly be understood by the third person.

While this invention has thus far been described in conjunction with a few embodiment thereof, it will readily be possible for those skilled in the art to put this invention into practice in various other manners. It will be understood that a switch element may be used instead of the attenuator 94 to open and close the transmission line 92 in response to the detection signal. The unit 10 or 70 may be included in the base station. The dummy voice signal may be supplied to the radio terminal 14 through a line different from that of the transmission signal.

What is claimed is:

1. A unit for use in a fixed facility of a radio frequency communication system between a telephone exchange of said fixed facility and a radio terminal thereof in preventing an interception of a radio frequency communication signal which carries a voice signal transmitted between said radio terminal and a mobile station of said radio frequency communication system, said unit being operable in response to a first internal signal transmitted from said radio terminal towards said telephone exchange and a second internal signal transmitted from said telephone exchange towards said radio terminal, said first and said second internal signals being produced in said radio terminal and said telephone exchange in relation to said radio frequency communication signal, respectively, wherein the improvement comprises:

detecting means coupled to a predetermined one of said telephone exchange and said radio terminal for detecting a selected one of first and said second internal signals to produce a detection signal on non-detection of said selected one of the first and the second internal signals;

signal producing means for producing a dummy voice signal which carries information irrespective of said voice signal; and adding means coupled to said signal producing means and responsive to said detection signal for adding said dummy voice signal to said second internal signal to produce a combination of said second internal signal and said dummy voice signal and to make said radio terminal transmit said combination of the second internal signal and the dummy voice signal as said radio frequency communication to said mobile station.

2. A unit as claimed in claim 1, said selected one of the first and the second internal signals being said first internal signal, wherein said detecting means comprises:

means coupled to said radio terminal for monitoring said first internal signal to produce said detection signal on non-detection of said first internal signal; and means for supplying said detection signal to said adding means.

3. A unit as claimed in claim 1, said selected one of the first and the second internal signals being said second internal signal, wherein said detecting means comprises:

means coupled to said telephone exchange for monitoring said second internal signal to produce said detection signal on non-detection of said second internal signal; and means for supplying said detection signal to said adding means to make said adding means produce said dummy voice signal instead of said voice signal.

4. A unit as claimed in claim 3, wherein said second internal signal results from said first internal signal.

5. A unit for use in a fixed facility of a radio frequency communication system between a telephone exchange of said fixed facility and a radio ternimal thereof in preventing an interception of a radio frequency communication signal transmitted between said radio terminal and a mobile station of said radio frequency communication system, said radio frequency communication signal being divisible into reception and transmission radio signals which are directed from said mobile station towards said fixed facility and from said fixed facility towards said mobile station, respectively, said reception radio signal carrying an ordinary voice signal and a control signal which is representative of presence of said ordinary voice signal, said unit comprising:

detecting means coupled to said radio terminal for detecting presence of said control signal in said reception radio signal to produce a detection signal representative of the presence of said control signal; and control means coupled to said telephone exchange and responsive to said detection signal for attenuating a transmission signal resulting from said ordinary voice signal through said telephone exchange to produce an attenuated transmission signal as said transmission radio signal and thereby prevent the interception of said transmission radio signal.

6. A unit as claimed in claim 5, wherein said control signal has a frequency different from that of said ordinary voice signal.

7. A mobile station for use in a radio frequency telephone communication system to produce a radio signal concerned with an ordinary voice signal, wherein the improvement comprises:

signal production means responsive to said ordinary voice signal for producing a control signal which is representative of the presence of said ordinary voice signal and which has a frequency different from that of said ordinary voice signal; and combining means coupled to said signal production means for combining said control signal with said ordinary voice signal to produce a combination signal as said radio signal.

* * * * *

UNITED STATES PATENT AND TRADEMARK OFFICE
CERTIFICATE OF CORRECTION

PATENT NO. : 4,727,568

DATED : February 23, 1988

INVENTOR(S) : MORISHIMA

It is certified that error appears in the above-identified patent and that said Letters Patent is hereby corrected as shown below:  Title page:

ABSTRACT, LINE 19  Delete "form" insert --from--.

Signed and Sealed this

Sixth Day of September, 1988

Attest:

DONALD J. QUIGG

*Attesting Officer*  *Commissioner of Patents and Trademarks*